United States Patent [19]

Alanara et al.

[11] Patent Number: 6,097,961
[45] Date of Patent: Aug. 1, 2000

[54] MOBILE STATION ORIGINATED SMS USING DIGITAL TRAFFIC CHANNEL

[75] Inventors: Seppo Alanara, Oulu, Finland; Steven J Willhoff, Richardson, Tex.

[73] Assignee: Nokia Mobile Phones Limited, Espoo, Finland

[21] Appl. No.: 08/746,088

[22] Filed: Nov. 6, 1996

[51] Int. Cl.⁷ .................................................. H04Q 7/20
[52] U.S. Cl. ..................... 455/466; 455/450; 455/509; 455/550
[58] Field of Search ..................................... 455/466, 422, 455/450, 451, 452, 455, 509, 511, 550, 434, 31.2, 31.3

[56] References Cited

U.S. PATENT DOCUMENTS

| | | | |
|---|---|---|---|
| 5,396,653 | 3/1995 | Kivari et al. | 455/88 |
| 5,430,740 | 7/1995 | Kivari et al. | 371/37.1 |
| 5,604,921 | 2/1997 | Alanara | 455/45 |
| 5,606,548 | 2/1997 | Vayrynen et al. | 370/252 |
| 5,655,215 | 8/1997 | Diachina et al. | 455/466 X |
| 5,822,700 | 10/1998 | Hult et al. | 455/466 |
| 5,878,036 | 3/1999 | Spartz et al. | 455/466 X |

OTHER PUBLICATIONS

IS–136.1 Revision A Published Version Mar. 21, 1996, pp. 10–12, 187, 226, 227, 230, 290, 324, 329.

*Primary Examiner*—Fan Tsang
*Assistant Examiner*—Philip J. Sobutka
*Attorney, Agent, or Firm*—Ohlandt, Greeley, Ruggiero & Perle, L.L.P.

[57] ABSTRACT

A method is disclosed for operating a user terminal, such as a cellular radiotelephone, of a type that is bidirectionally coupled to a network through an RF interface. The method includes a first step of storing at least one message in a memory accessible by the mobile station. A second step transmits a Teleservice origination (e.g., a SMS origination) request from the mobile station to the network using a reverse digital control channel. The request specifies that a reverse digital traffic channel be assigned to the mobile station. A next step, executed in response to being assigned to a reverse digital traffic channel, transmits the at least one stored message to a SMS center that is coupled to the network, the at least one stored message being transmitted over the assigned reverse digital traffic channel. In a preferred embodiment of this invention the SMS origination request is transmitted using a random access channel, the step of transmitting the at least one stored message includes a step of bypassing a voice coder and a data modem within the mobile station, and the step of transmitting the at least one stored message is accomplished in an ARQ mode of operation. Also disclosed is a method to deliver Teleservice messages in a wireless communications system that are not constrained by any message length limitations imposed by the air interface or network layers supporting the wireless service.

38 Claims, 5 Drawing Sheets

FIG. 6

| R_DATA MESSAGE LENGTH | TTS SEQ_NUM SIZE (BITS) | | | | |
|---|---|---|---|---|---|
| | 4 | 5 | 6 | 7 | 8 |
| 31 | 496 | 992 | 1984 | 3968 | 7936 |
| 63 | 1008 | 2016 | 4032 | 8064 | 16128 |
| 127 | 2032 | 4064 | 8128 | 16256 | 32512 |
| 190 | 3040 | 6080 | 12160 | 24320 | 48640 |
| 250 | 4000 | 8000 | 16000 | 32000 | 64000 |

TTS MAX MESSAGE SIZE BASED ON SEQ_NUM

| TTS MAX MESSAGE SIZE (BITS) | R_DATA MESSAGE LENGTH | | | | |
|---|---|---|---|---|---|
| | 31 | 63 | 127 | 190 | 250 |
| 4139 | 180 | 76 | 35 | 23 | 18 |
| 552 | 24 | 11 | 5 | 4 | 3 |
| 1064 | 47 | 20 | 9 | 6 | 5 |
| 2088 | 91 | 38 | 18 | 12 | 9 |

NUMBER OF R_DATA MESSAGES REQUIRED

| TTS + R_DATA HEADER BYTES: | 8 |
|---|---|
| TTS HEADER BYTES: | 3 |
| R_DATA HEADER BYTES: | 5 |

MOBILE STATION ORIGINATED SMS USING DIGITAL TRAFFIC CHANNEL

FIELD OF THE INVENTION

This invention relates generally to radiotelephones and, in particular, to mobile stations such as those capable of operation with a cellular network or with a personal communications network (PCN).

BACKGROUND OF THE INVENTION

The so-called Short Message Service (SMS) is a Teleservice specified in some modern cellular communications systems, for example IS-136, for enabling a user to send messages to, and receive text messages from, the communications network. The SMS attempts to deliver a message to a mobile station (MS) whenever the mobile station is registered to the network, even when the mobile station is engaged in a voice or data call. The mobile station may roam throughout the network and still be capable of sending and receiving messages. As presently specified in IS-136.1, a mobile station configured for SMS provides methods for the user to receive, read, clear, send, and save messages.

The IS-136 specification presently enables both mobile station terminated (network to mobile station) and mobile station originated (mobile station to network) SMS. The SMS Point-to-Point, Paging and Access Response Channel (SPACH) is specified for use in the mobile station terminated SMS mode. As is specified in IS-136.1 Rev. A, Mar. 21, 1996, Section 7.1.1.2.1 and Section 7.1.2.2, a SMS Submit message is also defined for sending a SMS message from the mobile station. The SMS Submit message is specified to be sent to the network, more particularly to the Base Station/Mobile Switching Center/Interworking Function (BMI), in an R-DATA message. The R-DATA message is sent on a reverse (i.e., MS→BMI) digital control channel.

It can be appreciated that the use of the reverse digital control channel to send the mobile station originated SMS messages has the disadvantage of consuming a valuable system resource that could otherwise be used to convey signalling information for, by example, mobile station registration and call origination purposes. Typically, there are significantly fewer digital control channels assigned in a wireless communications system than there are traffic (e.g., voice and/or data) channels. While the use of the digital control channel may not be especially disadvantageous for one mobile station transmitting a relatively short SMS messages (e.g., less than about 200 characters), if several mobile stations were simultaneously transmitting longer SMS messages the overall system capacity can be reduced.

Furthermore, existing Teleservices place restrictions on the length of messages that can be transmitted from a mobile station using the R-DATA message. Such restrictions can be a significant disadvantage when it is desired to transmit a message that exceeds the specified maximum length of the R-DATA message for a particular system.

More particularly, and referring specifically to the IS-136 air interface, Teleservices are supported for SMS and Over the Air Service Provisioning, that is, Over-the-Air Activation Teleservices (OATS). Other Teleservices are envisioned in the future. These Teleservices utilize the Layer 3 R-DATA message to transport their transactions over the air interface. At the BMI the R-DATA message is translated into a Short Message Delivery Point-to-Point (SMDPP) message for relay through the IS-41 network. These two mechanisms (R-DATA and SMDPP) can each impose constraints on the size of a Teleservice or Application transaction. It would thus be desirable to provide a method to free the Teleservice definition from these arbitrary constraints. In fact, these constraints may be so onerous that they may effectively shut a particular Teleservice down.

In IS-136 the BMI may limit the size of R-DATA messages through the R_Data_Message Length information element provided in the Fast Broadcast Control Channel (F-BCCH) Access Parameters message. This currently allows the BMI to limit mobile station originated R-DATA messages to either 31, 63, 127, or "Limited only by layer 2 format" (which provides approximately 250) bytes in length. There is also a proposal to define a new value that provides an air interface limit that conforms to the largest user data space that may be accommodated into one IS-41 SMDPP message. This is currently expected to be approximately 204 bytes.

OBJECTS OF THE INVENTION

It is thus an object of this invention to provide a wireless communications system that implements a mobile station originated Teleservice function, such as SMS, without the use of a reverse digital control channel.

It is a further object of this invention to provide a cellular communications system that implements a mobile station originated Teleservice function, such as SMS, through the use of a digital traffic channel which is normally allocated for voice and data transmissions.

It is another object of this invention to provide a method for effecting signalling between a mobile station and a BMI so as to enable a reverse digital traffic channel to be used to convey a Teleservice message, and to avoid the use of a vocoder or data modem that would typically be connected to the traffic channel by the BMI.

It is one further object of this invention to provide a method for message transmission that is unconstrained by R-DATA or SMDPP message length restrictions.

SUMMARY OF THE INVENTION

The foregoing and other problems are overcome and the objects of the invention are realized by methods and apparatus in accordance with embodiments of this invention.

A method of this invention is disclosed for operating a user terminal, such as a cellular radiotelephone, of a type that is bidirectionally coupled to a network through an RF interface. The method includes a first step of storing at least one message in a memory accessible by the mobile station. A second step transmits a Teleservice (e.g., SMS) origination request from the mobile station to the network using a reverse digital control channel. The request specifies that a reverse digital traffic channel be assigned to the mobile station. A next step, executed in response to being assigned to a reverse digital traffic channel, transmits the at least one stored message to a SMS center that is coupled to the network, the at least one stored message being transmitted over the assigned reverse digital traffic channel.

In a preferred embodiment of this invention the Teleservice origination request is transmitted using a random access channel, the step of transmitting the at least one stored message includes a step of bypassing a voice coder and a data modem within the mobile station, and the step of transmitting the at least one stored message is accomplished in an Automatic Retransmission Request (ARQ) mode of operation.

In one embodiment of this invention the mobile station transmits an Origination message having both Voice Mode and Data Mode fields set so as to inform the BMI that neither a vocoder or data modem are required to receive the mobile station's transmission. Having configured the BMI to receive a mobile station originated SMS transmission, the mobile station 10 transmits the SMS message on a digital traffic channel that is assigned by the BMI. In response, the BMI receives and demodulates the mobile station transmission and routes the received user data unit, along with appropriate identification and support information, to the SMS message center for subsequent processing in a conventional manner.

Further in accordance with this invention there is described a method to deliver Teleservices in a wireless communications system that are not constrained by any message length limitations imposed by the air interface or network layers supporting the wireless service. The method applies compression, encryption, segmentation and assembly services, end to end acknowledgment, retransmission of segments, and error detection and retransmission of the entire Teleservice transaction. This process is referred to herein as a Teleservice Transmission Service or TTS.

In accordance with this aspect of the invention a method is disclosed for operating a wireless communications network to transmit a Teleservices message from a source to a destination. The method includes the following steps: (a) inputting to a Teleservice Transmission Service (TTS) a Teleservices message to be transmitted, the Teleservices message being input through a first TTS Service Access Point (SAP); (b) partitioning the Teleservices message into a plurality of smaller message segments each having a maximum size that is equal to or less than a specified maximum length of a message unit (e.g., an R-DATA message data length) for a DCCH message transport facility; and (c) outputting the message segments from the TTS through a second TTS SAP to an air interface service for transmission to the destination. The method further includes optional steps of compression and/or encrypting the Teleservices message and then (d) transmitting a first message from the source to the destination for specifying at least a total number of message segments to be transmitted, the first message also conveying a first message segment; (e) transmitting one or more second messages from the source to the destination, each second message conveying a further message segment and also specifying at least a number of remaining message segments; and (f) transmitting a final message from the source to the destination, the final message conveying a last message segment and also specifying the end of the Teleservices message.

Although described primarily in the context of the SMS Teleservice, it should be appreciated that the teaching of this invention applies as well to other types of Teleservices, including OATS, and also future Teleservices.

BRIEF DESCRIPTION OF THE DRAWINGS

The above set forth and other features of the invention are made more apparent in the ensuing Detailed Description of the Invention when read in conjunction with the attached Drawings, wherein:

FIG. 6 is a table illustrating a TTS message size spreadsheet.

DETAILED DESCRIPTION OF THE INVENTION

Figure 1:
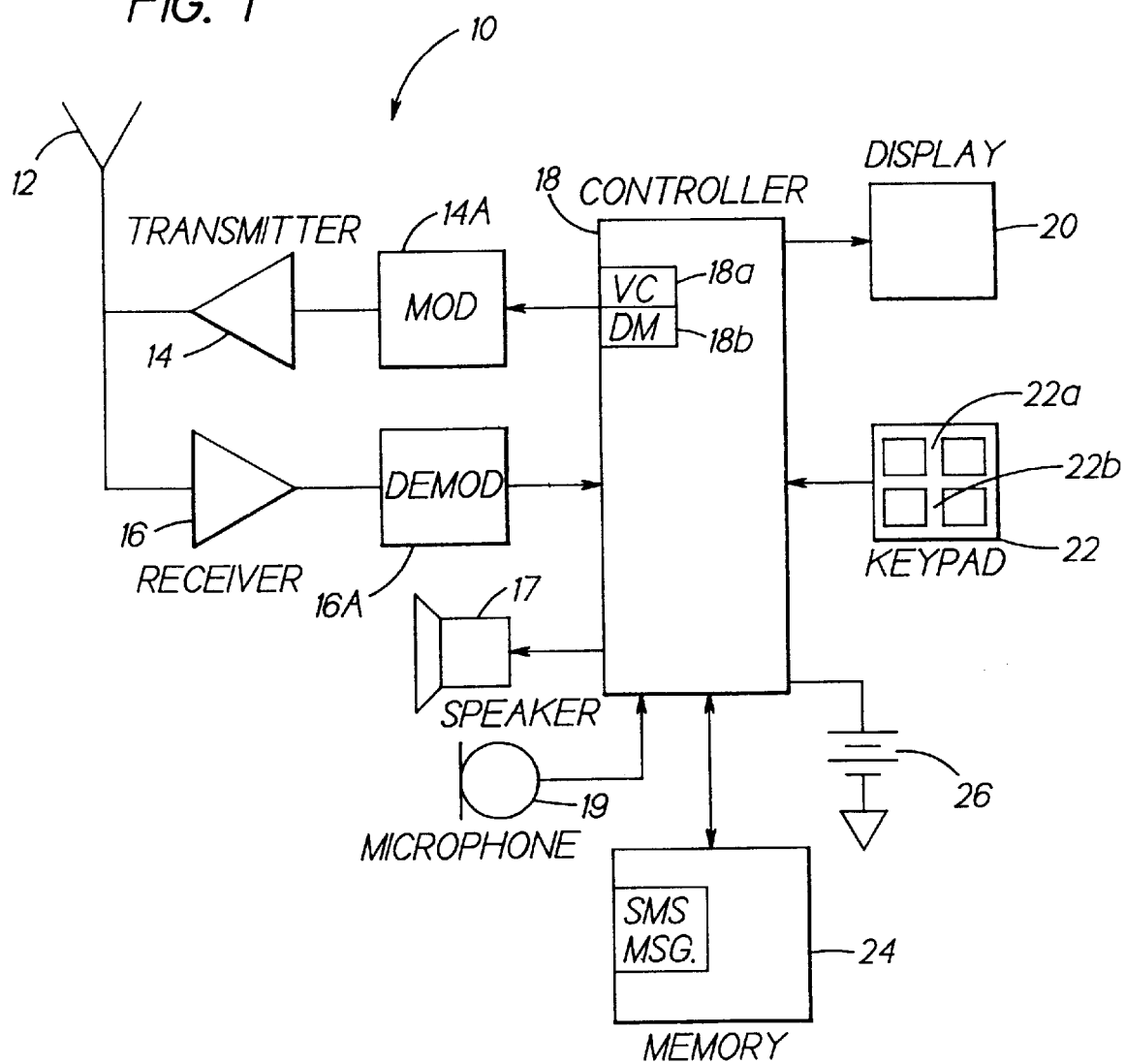
FIG. 1 is a block diagram of a mobile station that is constructed and operated in accordance with this invention.
Figure 2:
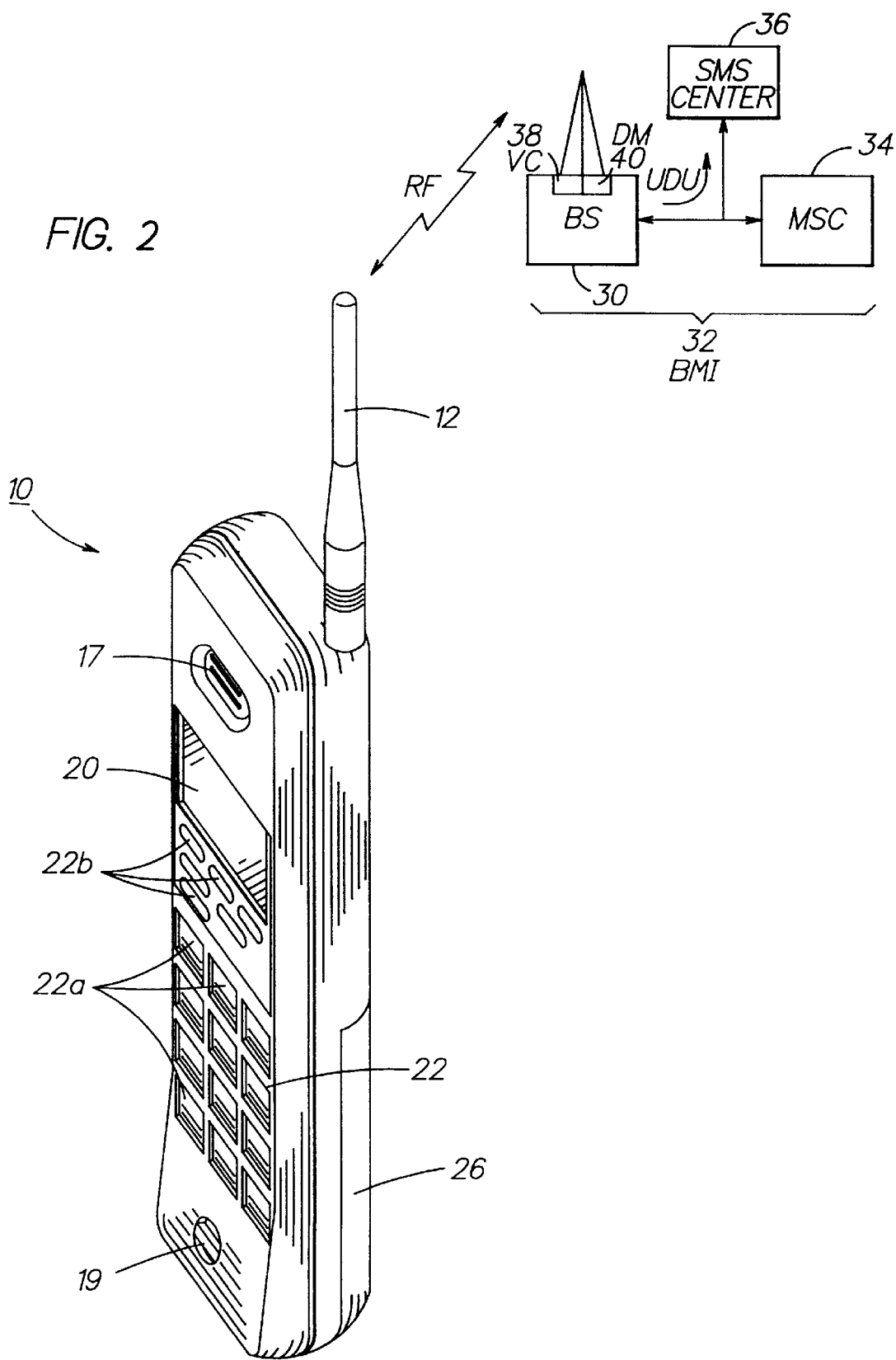
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a mobile terminal or station 10, in particular a cellular radiotelephone or a personal communicator, that is suitable for practicing this invention. The mobile station 10 includes an antenna 12 for transmitting signals to and for receiving signals from a base site or base station 30. The base station 30 is a part of a cellular network 32 that includes a mobile switching center (MSC) 34, a SMS center 36, voice coder/decoders (vocoders) VC 38, data modems (DM) 40, and other units required to operate the network. The MSC 34 is capable of routing calls and messages to and from the mobile station 10 when the mobile station is making and receiving calls. As was indicated above, the cellular network 32 may also be referred to as a Base Station/MSC/Interworking function (BMI).

The mobile station 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include at least SMS and/or OATS capability. One suitable type of Teleservice capability is defined in Section 7 of IS-136.1, Rev. A., as modified by the teaching of this invention.

A user interface includes a conventional speaker 17, a conventional microphone 19, a display 20, and a user input device, typically a keypad 22, all of which are coupled to the controller 18. The keypad 22 includes numeric and alphanumeric keys, related keys (#,*) 22a, and also other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 also stores data, including user messages, that are received from the cellular network 32 prior to the display of the messages to the user. The memory 24 also stores messages that are composed by the user prior to transmission to the BMI 32. In general, the operating program in the memory 24 includes routines to present messages and message-related functions to the user on the display 20. The memory 24 also includes routines for implementing the method described below in relation to FIG. 3, and also portions of FIG. 5.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating in accordance with any of a number of other digital standards, such as GSM, GSM/DCS, and IS-95 (CDMA). Narrow-band AMPS (NAMPS), as well as TACS, mobile stations may also benefit from the teaching of this invention. In general, the teaching of this invention applies to any radiotelephone or personal communicator that is capable of receiving or transmitting messages from or to a network, and that furthermore includes a user input device, such as a keypad, with which the user can generate messages and also interact with a displayed menu to select various mobile station functions and to input data. It should thus be clear that the teaching of this invention is not to be construed to be limited to any one particular type of mobile station or air interface standard.

One presently preferred air interface standard is one specified by IS-136.1, Rev. 1, Mar. 12, 1996, which includes facilities for providing digital control and traffic channels, SMS capabilities, and also a reverse Random Access Channel (RACH) which is used by the mobile station 10 to request access to the system. In a first aspect this invention exploits to advantage these and other features of IS-136 so as to provide an improved mobile station originated SMS capability. However, and as was indicated above, the teaching of this invention is not to be construed to be limited for use only with this one air interface standard, or with only SMS Teleservice capability.

IS-136.1 specifies the structure and information elements of SMS messages generally in Sections 7.1–7.3. One logical channel of the Digital Control Channel (DCCH) is referred to as the SMS Point-to-Point, Paging and Access Response Channel or SPACH (Section 2.3.2), which is used to transmit mobile station terminated SMS messages from the BMI 32. Also of interest is Section 6.4.4.9 (the R-DATA relay message), and Sections 7.1.1.2.1 and 7.1.2.2 (SMS Submit message). The SMS Submit message is currently specified to be sent by the mobile station 10 to the BMI in an R-DATA message, and includes a field (User Data Unit) for sending the user-inputted message.

In accordance with a first aspect of this invention, the mobile station 10 and BMI 32 are modified to instead send and receive, respectively, the User Data Unit over an assigned reverse Digital Traffic Channel (DTC).

Section 6.4.4.7 of IS-136.1, Rev. A, specifies the format of an Origination message that is sent from the mobile station 10 to the BMI 32. One field of this message is referred to as Voice Mode and another field is referred to as Data Mode.

The Voice Mode field information element is defined to not be included if a Service Code information element indicates analog speech only. The Voice Mode information element may not be included if the Service Code indicates digital speech only, or analog or digital speech. If not included, the Voice Mode is defined to default to a VSELP voice coder (and no voice privacy).

The Data Mode information element is defined to be included if the Service Code indicates ASYNC Data or G3-Fax. This information element is defined to not be included if the Service Code indicates speech.

In one embodiment of this invention the mobile station 10 sends the origination message with both the Voice Mode and Data Mode fields set so as to inform the BMI that neither the vocoder 38 or data modem 40 are required to receive the mobile station's transmission. Having configured the BMI 32 to receive the mobile station originated SMS transmission, the mobile station 10 then transmits the SMS message on an assigned digital traffic channel. In response, the BMI 32 receives and demodulates the mobile station transmission and routes the received user data unit, along with appropriate identification and support information (see Section 7.1.2.2), to the SMS message center 36 for subsequent processing in a conventional manner.

Figure 3:
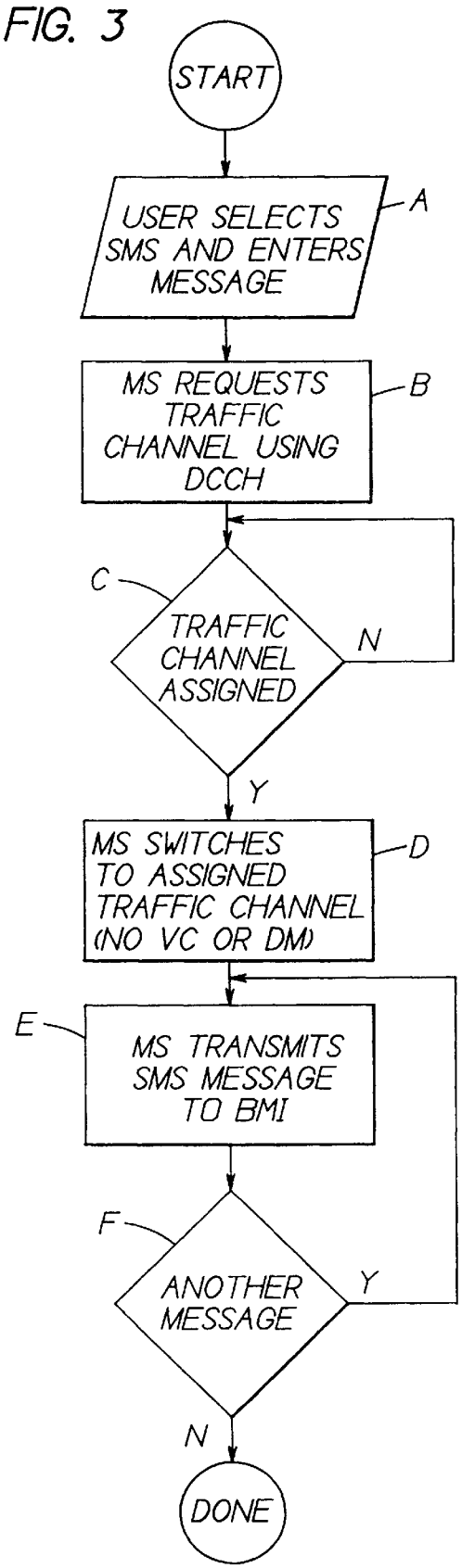
FIG. 3 is a logic flow diagram illustrating one method of this invention, specifically a mobile station implemented method of transmitting a SMS message over a digital traffic channel.

In greater detail, and referring now to FIG. 3, at Block A the mobile station responds to a user selecting a SMS origination mode and the entry, via the keypad 22, of the user's message. It should be noted that in some embodiments of this invention the mobile station 10 can be connected to an external data processor through a suitable data connection, and the user is thereby enabled to enter the message from the external data processor. The entered SMS message is stored in the memory 24 prior to transmission.

It should be noted the stored message need not be entered by the user, but could instead, by example, have been previously received from the air interface, in which case the message is being forwarded to another user.

At Block B the mobile station requests the assignment of a digital traffic channel using the DCCH, specifically the RACH. The traffic channel can be requested using the above-described origination message (Section 6.4.4.7). That is, the mobile station 10 makes a request for a traffic channel while indicating that neither the vocoder 38 or data modem 40 is required at the BMI 32 end. If desired, the signalling protocol can be modified so as to define a specific mobile station originated SMS message, which message is then interpreted by the BMI 32 as a request to assign a reverse digital traffic channel to the mobile station 10 without the use of the vocoder 38 or data modem 40.

At Block C the mobile station 10 waits for a digital traffic channel to be assigned. At Block D the mobile station 10 switches to the assigned digital traffic channel, but does not activate its internal voice coder (VC) 18a or, if present, data modem (DM) 18b.

At Block E the mobile station 10 transmits the SMS message stored in the memory 24 using the assigned digital traffic channel. At Block F the mobile station 10 checks to see if additional SMS messages have been stored in the memory 24. If Yes, control passes back to Block E to transmit the further SMS message. If No, the mobile station procedure terminates.

Before transmission of the SMS message on the assigned DTC the mobile station 10 may transmit FACCH filler messages. Also, and in accordance with conventional operation on the DTC, the mobile station 10 may initially transmit shortened bursts to the BMI 32.

Figure 4:
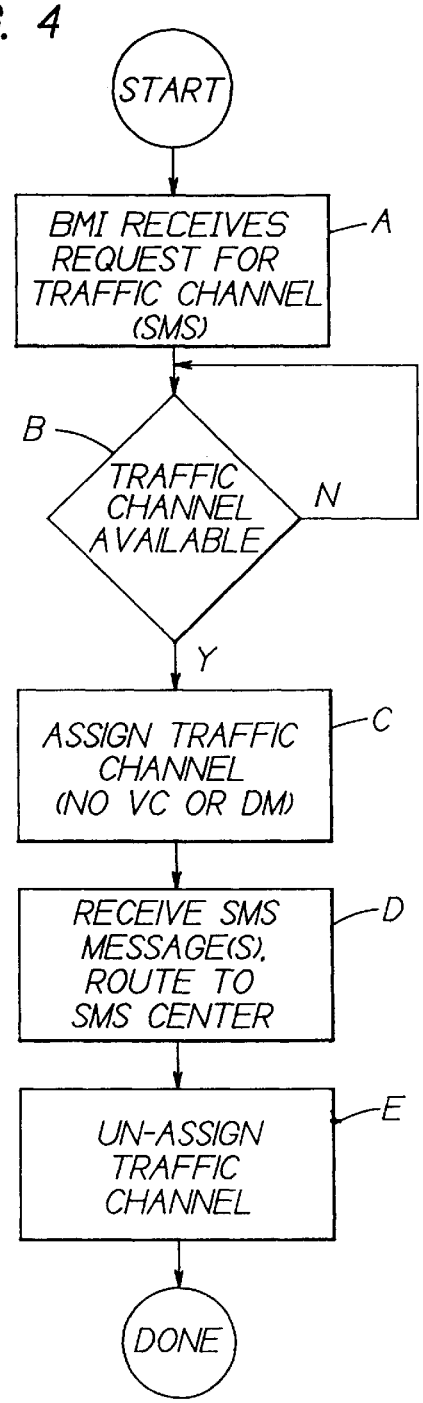
FIG. 4 is a logic flow diagram illustrating a second method of this invention, specifically a BMI implemented method of setting up and receiving a SMS message over a digital traffic channel.

Referring now to FIG. 4, there is illustrated the corresponding procedure performed by the BMI 32. At Block A the BMI 32 receives a request for a digital traffic channel for use in the mobile station originated SMS mode. At Block B the BMI determines if a digital traffic channel is available for use by the mobile station 10. Assuming that a digital traffic channel is available, at Block C the BMI 32 assigns the available digital traffic channel to the mobile station 10. The assignment can be made using a conventional forward DCCH assignment message (see Section 6.4.3.6, Digital Voice Channel Designation message). The BMI 32 does not activate the vocoder 38 or data modem 40 for the assigned digital traffic channel. At Block D the BMI 32 receives one or more SMS messages over the assigned digital traffic channel from the mobile station 10 and demodulates the received transmission to extract the SMS user data unit therefrom. The extracted user data unit (UDU) is then routed to the SMS message center 36 for further processing in a conventional manner. The user data unit is typically accompanied by other information, such as Acknowledgment Requests, Call Back Number, etc., as indicated in the SMS Submit message shown in Section 7.1.2.2 of IS-136.1, Rev. A.

Any acknowledgements that are required to be transmitted from the BMI 32 to the mobile station 10 are transmitted on a corresponding forward DTC. Between such transmissions, and because no voice coder has been allocated to the forward DTC, the BMI 32 sends FACCH filler messages while not responding to the mobile station messages. Also, while sending the SMS message(s) the mobile station may use the ARQ procedures.

At Block D, and assuming that the SMS message or messages have been received from the mobile station 10, the BMI 32 unassigns the traffic channel and terminates the procedure.

In a further embodiment of the invention, the mobile station SMS origination message request can be made to a specific directory telephone number assigned to the SMS message center 36.

As was stated above, when using the digital traffic channel for the SMS transmission the BMI 32 may simply send filler FACCH messages, except when acknowledging the receipt of the mobile station SMS messages. The mobile station 10 will typically send the SMS message using either the Automatic Retransmission Request (ARQ) mode (see Section 5.4, IS-136.1, Rev. A), or the R-DATA message mode, as transport. It should be noted that the R-DATA transport mode, without voice, can also be used to send other information related to other Teleservices, such as OATS.

In accordance with an aspect of this invention the Block B of FIG. 3 can be modified so as to include a preliminary decision step as to whether to send the SMS message using the reverse digital control channel, or to send the SMS message using the digital traffic channel in accordance with an aspect of this invention. By example, this determination can be based on the length of the message stored in the memory 24 (e.g., all messages greater than n characters are sent using the digital traffic channel), or can be based on a user specifying one mode of transport over the other, or could be based on existing system conditions. By example, during periods of heavy system loading it may be more desirable to send all SMS messages over a digital traffic channel to avoid congestion of the reverse digital control channels.

The flow chart of FIG. 3 can also be modified so as to enable a discontinuous SMS transmission mode of operation. By example, in response to the user beginning to compose the SMS message at Block A, the mobile station can begin the request for the digital traffic channel and can thereafter initiate the transmission of the partially composed message to the BMI 32.

Having described a first embodiment of this invention, a further embodiment will now be described with respect to FIGS. 5 and 6. Although this further embodiment of the invention is also specifically described in the context of the IS-136 Teleservices, these teachings are generally applicable to any Wireless Communications System offering Teleservice or Application layer services to wireless terminals.

In accordance with this further embodiment of the invention there is described a method to deliver Teleservices in a wireless communications system. This method is not constrained by any message length limitations imposed by the air interface or network layers supporting the wireless service. In general, the method applies compression, encryption, segmentation and assembly services, end to end acknowledgment, retransmission of segments, and error detection and retransmission of the entire Teleservice transaction, and is referred to a Teleservice Transmission Service or TTS.

This further aspect of the invention makes more efficient use of the DCCH when transmitting SMS and other Teleservice messages. However, it should be realized that this further embodiment of the invention can also be used for transporting one or more SMS messages using the DTC as described above.

Figure 5:
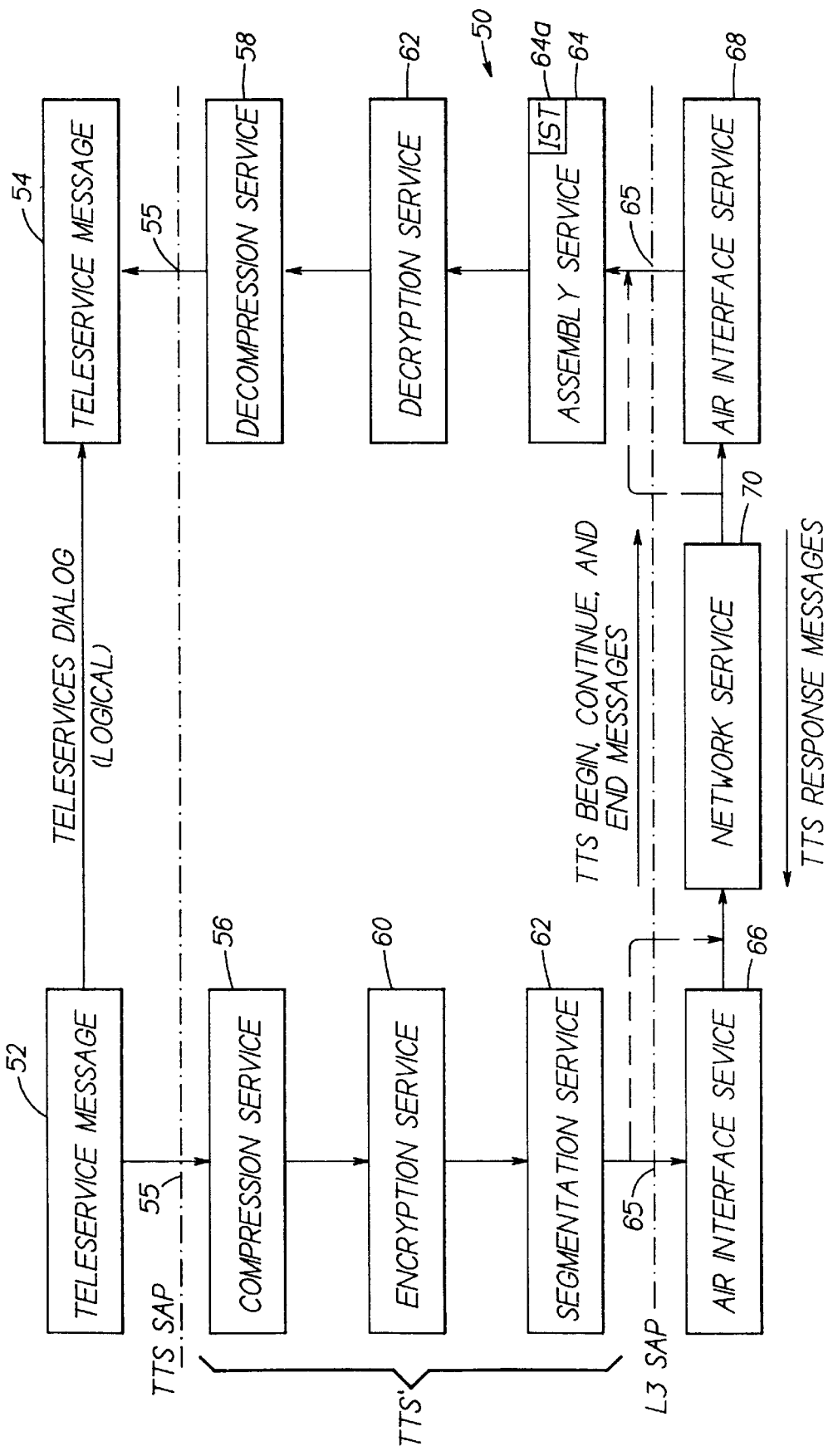
FIG. 5 is a simplified block diagram illustrating signal and message flow through a Teleservice Transmission Service (TTS) in accordance with an aspect of this invention.

FIG. 5 depicts the relation between each of the subservices offered by the Teleservice Transmission Service 50, the Teleservice user (e.g., the mobile station 10), and the Air Interface Service used by the TTS. The various Service Access Points (SAP) defining the input and output boundaries of the TTS are identified.

Block 52 in FIG. 5 illustrates a Teleservice message, such as but not limited to a user-composed SMS message, that is to be transported from a source (e.g., the mobile station 10) to a destination (e.g., the BMI 32). The arrow designated as Teleservices Dialog indicates that the Teleservice message is logically transferred directly to the destination peer Teleservice. The delivered or transferred message is designated 54. However, the actual Teleservices message delivery involves several underlying services, as will now be described.

The Teleservice message 52 is applied across a first TTS service access point (SAP) 55 to a compression service 56. The compression service 56, and a corresponding decompression service 58, are used to reduce the size of the Teleservice message so as to limit the required message bandwidth, and to then subsequently expand the compressed message, respectively. Any suitable data compression and decompression algorithm can be employed to implement the compression and decompression services 56 and 58. After compression the Teleservice message is applied to an encryption service 60. The encryption service 60, and a corresponding decryption service 62, are utilized to protect the privacy and confidentiality of the Teleservice message. As with the compression and decompression services, any suitable data encryption and decryption algorithm may be employed.

It should be noted that the use of the compression and decompression services 56 and 58, and/or the encryption/decryption services 60 and 62 is optional.

The compressed and encrypted Teleservice message is next applied to a segmentation service 62. The segmentation service 62 is employed, in accordance with an aspect of this invention, to distribute or partition the Teleservice message into as many air interface messages (e.g., R-DATA messages) as are necessary to deliver the Teleservice message. A corresponding assembly service 64 is used to reassemble the distributed Teleservice message into a complete message, prior to decryption and decompression. The reassembly process, and subsequent error checking, acknowledgement, decryption, and decompression processes is governed by various information fields that form a part of the Teleservices message transmission protocol, as will be described below.

The output of the segmentation service 62 is applied to a Layer 3 SAP 65 and thence to the air interface service 66. A transmit air interface service 66 and a receive air interface service 68 provide the necessary size limits to insure that network service constraints are not violated. In the IS-136 embodiment the segmentation service 62 operates, in accordance with an aspect of this invention, to partition or encapsulate the Teleservice message into one or more R-DATA messages, which are then provided to the air interface service 66. The output of the air interface service 66 is applied to the network service 70 which physically transports the Teleservice message to the received air interface service 68 (e.g., from the mobile station 10 to the BMI 32 using the assigned logical and physical channel).

It should be noted that, in some embodiments of this invention, one of the air interface services 66 or 68 could be bypassed (indicated by the dashed arrows), and the data sent instead though, by example, a wired network. In general, one of the air interface service blocks 66 or 68 includes the base station 30 and the RF links to a mobile station 10, while the network service block 70 includes the MSC and interworking function. It should be further noted that the air interface service blocks 66 and 68 need not both implement the same air interface (e.g., IS-136).

The path from block 68 to block 54 provides the opposite or reverse functionality of the forward path from block 52 to block 66. In the reverse path the Layer 3 SAP 65 and TTS SAP 55 are traversed in the reverse order compared to the forward path. It is noted that forward and reverse in this sense may not necessarily correspond to the forward and reverse channels between the mobile station 10 and the BMI 32. The end result is the transport of the Teleservice message 52 from the source to the destination as the Teleservice message 54.

For seamless integration with existing Teleservice definitions in, for example IS-136, a new Higher Layer Protocol Identifier (HLPI) is allocated for the TTS. This is the HLPI that is used in the R-DATA message. The actual Teleservice HLPI is carried within a TTS Header, which allows the TTS to deliver the complete message to the appropriate Teleservice.

In the preferred embodiment of this invention the TTS Header is appended to the beginning of each Teleservice message 52 that requires transmission. Additionally, a TTS Segment Header is appended to the beginning of each TTS Message Segment submitted to Layer 3 for encapsulation into an R-DATA message. The following Tables A–D depict these header formats.

TABLE A

TTS Begin Message Header

| Field | Length (bits) |
|---|---|
| TTS Protocol Discriminator | 2 |
| TTS Message Type | 3 |
| TTS Transaction ID | 3 |
| TTS Sequence Number | 8 |
| Segment Remaining Length (N) | 8 |
| TTS Message Length (bytes) | 13 |
| Teleservice HLPI | 8 |
| Compression | 2 |
| Encryption | 2 |
| Teleservice message Length (bytes) | 13 |
| Number of Segments | 8 |
| Acknowledgement Window | 2 |
| CRC Status | 1 |
| Segment Data | N |

TABLE B

TTS Continue Message Header

| Field | Length (bits) |
|---|---|
| TTS Protocol Discriminator | 2 |
| TTS Message Type | 3 |
| TTS Transaction ID | 3 |
| TTS Sequence Number | 8 |
| Segment Remaining Length (N) | 8 |
| Segment Data | N |

TABLE C

TTS End Message Header

| Field | Length (bits) |
|---|---|
| TTS Protocol Discriminator | 2 |
| TTS Message Type | 3 |
| TTS Transaction ID | 3 |
| TTS Sequence Number | 8 |
| Segment Remaining Length (N) | 8 |
| Segment Data | N |
| CRC | 16 |

TABLE D

TTS Response Message Header

| Field | Length (bits) |
|---|---|
| TTS Protocol Discriminator | 2 |
| TTS Message Type | 3 |
| TTS Transaction ID | 3 |
| TTS Status | 8 |
| Number of segments | 8 |
| TTS Acknowledgement Map | 1–256 |

The following field definitions are used for TTS Messages. All bit patterns that are not specifically defined may be considered to be reserved.

TTS Protocol Discriminator
00: TTS Protocol Version No.
TTS Message Type
000: TTS Begin
001: TTS Continue
010: TTS End
011: TTS Response
TTS Transaction ID
Set by the originator of the TTS Message 52. The ID field is used to distinguish message streams, and thus allows multiple, concurrent Teleservices to be active at the same time.
TTS Sequence Number
Begins at zero, increments one value per segment, within a segment stream (TTS Transaction ID).
TTS Message Length
Total length in bytes of the TTS Message (the Teleservice Message after the compression service 56 and encryption service 60 have been employed. If neither if these services is used, the TTS Message Length is the same as the Teleservice Message Length).
Teleservice HLPI
HLPI associated with the Teleservice
Compression
Indicates whether the compression service 56 was utilized on the Teleservice Message, and the compression algorithm employed.

00: No Compression
01: Compression algorithm=XXXX

Encryption

Indicates whether the encryption service 60 was utilized on the Teleservice Message, and the encryption algorithm employed.

00: no encryption
01: Encryption algorithm=XXXX

Teleservice Message Length

Total length of the Teleservice message in plain text (i.e., at the TTS SAP 55 before the application of compression and encryption operations).

Number of Segments

The number of segments necessary to transmit the entire TTS Message. In IS-136, this is the number of R-DATA messages required to convey the, possibly compressed and encrypted, TTS Message 52.

Acknowledgement Window

How often the receiving TTS receiving entity should return positive receipt confirmation via a TTS Response Message. The receiving entity also responds at the last segment, and whenever an inter-segment timer (IST) 64a expires.

00: Respond every 4 segments
01: Respond every 8 segments
10: Respond every 16 segments CRC Status 0: CRC not calculated/provided for Teleservice Message 52
1: CRC calculated/provided for Teleservice Message. The CRC Calculation is performed prior to any compression or encryption at the TTS layer.

Segment Remaining Length (N)

Length in bytes of the remainder of the segment data.

Segment Data

The N bytes of segment data conveyed in this TTS message segment.

CRC

The 16 bit CRC calculated over the original Teleservice Message.

TTS Status

Reports the current status of the TTS Transaction ID stream (in hexadecimal notation).

00: Status OK, operation continuing
01: Inter-Segment Timeout
02: TTS Transaction ID message stream aborted
03: CRC Error
04: Compression Selection not Supported
05: Encryption Selection not Supported
06: TTS Protocol Version not Supported
07: TTS Message Length Error
08: Teleservice Message Length Error
09: Teleservice Message Too Long (indicates insufficient storage for this message)
0A: Status OK, Teleservice Message Correctly Received TTS Acknowledgement Map A bitmap showing the received status of the TTS Segments associated with a given TTS Message stream. The status of each segment is given, with segment zero present in the LSB of byte one and the status of segment 255 given in the MSB of byte 32. Only the number of bytes necessary to convey status for the Number of Segments are sent.

0: Segment (i) not received
1: Segment (i) received

In accordance with the foregoing it can be appreciated that this aspect of the invention enables a Teleservices message 52 to be encapsulated or partitioned into a plurality of smaller R-DATA messages, each having a maximum size equal to or less than the size supported by the air interface services 66 and 68 and the network service 70. The partitioned Teleservices message is then transmitted to a destination in accordance with the foregoing messaging protocol, and subsequently reassembled into the original Teleservices message. Between segments (continuation or end segments) the inter-segment timer (IST) 64a maintained by the destination assembly service 64 is used to insure the continuity of segment transmissions. The use of data compression provides for an efficient use of bandwidth, while the use of encryption provides for message privacy.

One significant advantage of this invention is that it allows current and future Teleservices to be defined independently of the air interface technology, as well as independently of any presumptions concerning the service provided by the network layer.

In practice, there is some upper limit on the size of a given Teleservice message. In fact, this limit may be variable, as it is imposed through the Sequence Numbers that the TTS assigns for each Air Interface message that is dispatched.

This implies, by example, that a message sequence sent through a BMI 32 supporting 127 bytes per R-DATA has a larger theoretical message size than one supported by a BMI that limits the R-DATA to 31 bytes. This variance is controlled by defining a maximum size Teleservice message, and insuring that the message Sequence Number range is sufficient to convey that size message through the smallest valid R-DATA pipeline.

FIG. 6 depicts various potential sizing limits for the TTS. The exemplary spreadsheet in FIG. 6 provides information that may assist in determining the best sizing for messages at the TTS layer. The message size limit needs to accommodate the largest supported user message carried through a Teleservice (for example, the SMS message), the Teleservice header information, the R-DATA header information, and the TTS and R-DATA headers.

For example, and assuming a user message of 512 bytes, 20 bytes of Teleservice Header data, and 20 bytes of TTS header data provides for a 552 byte TTS message. If an additional 8 bytes of R-DATA and TTS header per R-DATA message is included, the number of R-DATA messages required to convey this user message is calculated at the various R-DATA Message Length values. Once the maximum User Data size is determined, the number of bits necessary for the TTS Sequence Number is determined from the number of R-DATA messages required (i.e., each required R-DATA message equates to one TTS sequence or segment.)

It can be appreciated that this aspect of the invention can be used for transporting Teleservice messages (e.g., SMS messages) using the R-DATA convention and DCCH of, by example, IS-136. It should be further appreciated that the use of this aspect of the invention can also be employed when a DTC is allocated for R-DATA transactions, as was described above in reference to FIGS. 3 and 4.

It is noted that the various message information fields, bit and byte lengths, bit value assignments, numbers of segments between acknowledgement messages, etc., are illustrative and not limiting. Furthermore, the various messages defined in Tables A–D can be modified to delete information elements and/or to add information elements. It should further be realized that the drawing of FIG. 5 can be read as a process flow diagram, or as a block diagram of interconnected hardware and/or software modules.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station of a type that is bidirectionally coupled to a communications network through a wireless interface, comprising the steps of:

in response to a presence of at least one message to be transmitted by the mobile station, determining in the mobile station if the at least one message is to be transmitted over a reverse digital control channel or over a reverse digital traffic channel;

in response to the mobile station determining that the at least one message is to be transmitted over a reverse digital traffic channel, transmitting a message origination request from the mobile station to the network using a reverse digital control channel, the request specifying that a reverse digital traffic channel be assigned to the mobile station; and in response to being assigned to a reverse digital traffic channel, transmitting the at least one message to a message center that is coupled to the network, the at least one message being transmitted over the assigned reverse digital traffic channel.

2. A method as set forth in claim 1, wherein the message origination request is transmitted using a random access channel.

3. A method as set forth in claim 1, wherein the step of transmitting the at least one message includes a step of bypassing a voice coder within the mobile station.

4. A method as set forth in claim 1, wherein the step of transmitting the at least one message includes a step of bypassing a data modem within the mobile station.

5. A method as set forth in claim 1, wherein the step of transmitting the at least one message is accomplished in an ARQ mode of operation.

6. A method as set forth in claim 1, wherein the message has a length that exceeds a specified maximum length of a message transport facility, and further comprising a step of partitioning the message into a plurality of segments each having a length equal to or less than the specified maximum length prior to the step of transmitting the at least one message.

7. A method as set forth in claim 6, wherein the step of partitioning includes a step of compressing the message.

8. A method as set forth in claim 6, wherein the step of partitioning includes a step of encrypting the message.

9. A method as set forth in claim 6, wherein the step of partitioning includes steps of:

compressing the message; and encrypting the compressed message.

10. A method for operating a communications network of a type that is bidirectionally coupled to a mobile station through a wireless interface, comprising the steps of:

determining in the mobile station if a Teleservices message is to be transmitted over a reverse digital control channel or over a reverse digital traffic channel;

in response to the mobile station determining that the Teleservices message is to be transmitted over the reverse digital traffic channel, transmitting a Teleservices origination message over a reverse digital control channel;

in response to receiving a Teleservice origination request from a mobile station over the reverse digital control channel, assigning a reverse digital traffic channel to the mobile station;

receiving at least one Teleservice message from the mobile station over the assigned reverse digital traffic channel; and routing the received at least one Teleservice message to a message center that is coupled to the network.

11. A method as set forth in claim 10, wherein the Teleservice origination request is received from a random access channel.

12. A method as set forth in claim 10, wherein the step of receiving the at least one Teleservice message includes a step of bypassing a voice decoder within the communications network.

13. A method as set forth in claim 10, wherein the step of receiving the at least one Teleservice message includes a step of bypassing a data modem within the communications network.

14. A method as set forth in claim 10, wherein the step of receiving the at least one Teleservice message is accomplished in an ARQ mode of operation.

15. A method for operating a communications network of a type that is bidirectionally coupled to a mobile station through a wireless interface, comprising the steps of:

in response to receiving a Teleservice origination request from a mobile station over a reverse digital control channel, assigning a reverse digital traffic channel to the mobile station;

receiving at least one Teleservice message from the mobile station over the assigned reverse digital traffic channel; and routing the received at least one Teleservice message to a message center that is coupled to the network, wherein the Teleservice message has a length that exceeds a specified maximum length of digital control channel message transport facility, wherein the step of receiving receives the Teleservice message as a plurality of segments each having a length equal to or less than the specified maximum length, and further comprising the steps of reassembling the segments into the Teleservice message.

16. A method as set forth in claim 15, wherein the step of reassembling includes a further step of decompressing the reassembled Teleservice message.

17. A method as set forth in claim 15, wherein the step of reassembling includes a further step of decrypting the reassembled Teleservice message.

18. A method as set forth in claim 15, wherein the step of reassembling includes the further steps of:

decrypting the reassembled Teleservice message; and decompressing the decrypted Teleservice message.

19. A mobile station of a type that is bidirectionally coupled to a communications network through a wireless interface, comprising:

a controller for storing at least one message in a memory accessible by the mobile station, said controller further determining if the at least one stored message is to be transmitted over a reverse digital control channel or over a reverse digital traffic channel; and transmission circuitry, responsive to the controller determining that the at least one message is to be transmitted over a reverse digital traffic channel, for transmitting a SMS origination request from the mobile station to the network using a reverse digital control channel, the request specifying that a reverse digital traffic channel be assigned to the mobile station, said transmission circuitry being responsive to an assignment of a reverse digital traffic channel to the mobile station, for transmitting the at least one stored message to a SMS center that is coupled to the network, the at least one stored message being transmitted over the assigned reverse digital traffic channel.

20. A mobile station as set forth in claim 19, wherein the SMS origination request is transmitted using a random access channel.

21. A mobile station as set forth in claim 19, wherein said controller operates to bypass a voice coder within the mobile station when transmitting the at least one stored message.

22. A mobile station as set forth in claim 19, wherein said controller operates to bypass a data modem within the mobile station when transmitting the at least one stored message.

23. A mobile station as set forth in claim 19, wherein said transmission circuitry and said controller operate in an ARQ mode of operation when transmitting the at least one stored message.

24. A method as set forth in claim 19, wherein said controller comprises means for at least one of compressing the SMS message or encrypting the SMS message prior to said transmission circuitry transmitting the stored SMS message.

25. A method for operating a wireless communications network to transmit a Teleservices message from a source to a destination, comprising the steps of:

inputting to a Teleservice Transmission Service (TTS) a Teleservices message to be transmitted, the Teleservices message being input through a first TTS Service Access Point (SAP);

partitioning the Teleservices message into a plurality of smaller message segments each having a maximum size that is equal to or less than a specified maximum length of a message unit for a digital control channel (DCCH) message transport facility;

outputting the message segments from the TTS through a second SAP to an air interface service for transmission to the destination;

transmitting a first message from the source to the destination for specifying at least a total number of message segments to be transmitted, the first message also conveying a first message segment;

transmitting one or more second messages from the source to the destination, each second message conveying a further message segment and also specifying at least a number of remaining message segments; and transmitting a final message from the source to the destination, the final message conveying a last message segment and also specifying the end of the Teleservices message.

26. A method as set forth in claim 25, wherein the step of partitioning includes a preliminary step of compressing the Teleservices message.

27. A method as set forth in claim 25, wherein the step of partitioning includes a preliminary step of encrypting the Teleservices message.

28. A method as set forth in claim 25, wherein the step of partitioning includes the preliminary steps of:
compressing the Teleservices message; and
encrypting the compressed Teleservices message.

29. A method as set forth in claim 28, wherein the step of transmitting the first message transmits information for specifying a type of compression that was applied to the Teleservices message, if any, and information for specifying a type of encryption that was applied to the Teleservices message, if any.

30. A method as set forth in claim 25, wherein the steps of transmitting each transmit information for specifying an identification of the Teleservices message.

31. A method as set forth in claim 25, and further comprising a step of receiving a response message from the destination, the response message including information for specifying, for each transmitted message segment, whether the message segment was correctly received.

32. A method as set forth in claim 25, wherein the steps of transmitting transmit the messages through the digital control channel (DCCH).

33. A method as set forth in claim 25, wherein the steps of transmitting transmit the messages through a digital traffic channel (DTC), and wherein the steps of transmitting each include a step of bypassing a voice coder in the source.

34. A method as set forth in claim 25, wherein the steps of transmitting transmit the messages through a digital traffic channel (DTC), and wherein the steps of transmitting each include a step of bypassing a data modem in the source.

35. A method as set forth in claim 25, wherein the Teleservice message is a SMS message.

36. A method as set forth in claim 25, wherein the Teleservice message is an OATS message.

37. A method for operating a mobile station of a type that is bidirectionally coupled to a communications network through a wireless interface, comprising the steps of:

in response to a presence of a message to be transmitted by the mobile station, determining in the mobile station if the message is to be transmitted over a reverse digital control channel or over a reverse digital traffic channel, the determination being based on a length of the message;

in response to the mobile station determining that the message is to be transmitted over a reverse digital traffic channel, transmitting a message origination request from the mobile station to the network using a reverse digital control channel, the request specifying that a reverse digital traffic channel be assigned to the mobile station; and in response to being assigned to a reverse digital traffic channel, transmitting the message over the assigned reverse digital traffic channel.

38. A method for operating a mobile station of a type that is bidirectionally coupled to a communications network through a wireless interface, comprising the steps of:

in response to a presence of a message to be transmitted by the mobile station, determining in the mobile station if the message is to be transmitted over a reverse digital control channel or over a reverse digital traffic channel, the determination being based on a user input;

in response to the mobile station determining that the message is to be transmitted over a reverse digital traffic channel, transmitting a message origination request from the mobile station to the network using a reverse digital control channel, the request specifying that a reverse digital traffic channel be assigned to the mobile station; and in response to being assigned to a reverse digital traffic channel, transmitting the message over the assigned reverse digital traffic channel.

* * * * *